United States Patent [19]
Brooks et al.

[11] 3,773,269
[45] Nov. 20, 1973

[54] CONTINUOUS STACK FEEDER AND METHOD

[75] Inventors: Dean P. Brooks, Hesston; John Dale Anderson, Canton, both of Kans.

[73] Assignee: Hesston Corporation, Hesston, Kans.

[22] Filed: Dec. 20, 1971

[21] Appl. No.: 209,599

[52] U.S. Cl............. 241/282.1, 83/490, 241/101 A
[51] Int. Cl........................ B02c 18/00, B26d 1/18
[58] Field of Search..................... 83/37, 200.1, 490; 241/277, 280, 282.2, 101.5, 101 A

[56] References Cited
UNITED STATES PATENTS

| | | | |
|---|---|---|---|
| 2,048,473 | 7/1936 | Schreiber | 241/277 X |
| 3,208,491 | 9/1965 | Bliss | 241/280 X |
| 3,353,430 | 11/1967 | Brackmann et al. | 83/490 X |

*Primary Examiner*—Willie G. Abercrombie
*Attorney*—Schmidt, Johnson, Hovey & Williams

[57] ABSTRACT

In the continuous feeding from a stack, the entire stack is advanced horizontally without interruption toward a cutter which incessantly slices the material from the leading end of the stack and, at all times as the slice gravitates in a constant flow from the cutter, it is steadily removed at a rate to avoid buildup beneath the cutter, and immediately discharged in a ceaseless stream to a point or area of discharge. In order to effect cutting of the stack throughout its entire transverse cross-sectional area from side to side and top to bottom, the cutter is caused to sweep along a polygonal path that corresponds essentially in shape to the transverse, peripheral configuration of the stack. The cut is on an inclined plane and the cutter opens the kerf as it travels in order to deflect the slice away from the stack, all for the purpose of assuring a steady, uniform gravitation of the cutaway material to a lateral conveyor beneath the cutter. The cutter is also rotated continuously while it sweeps through the stack, and is canted to present a leading bite so as to avoid drag on the stack along the trailing portions of the cutter.

13 Claims, 10 Drawing Figures

PATENTED NOV 20 1973

INVENTORS.
Dean P. Brooks
John Dale Anderson
BY
Schmidt, Johnson, Hovey & Williams
ATTORNEYS.

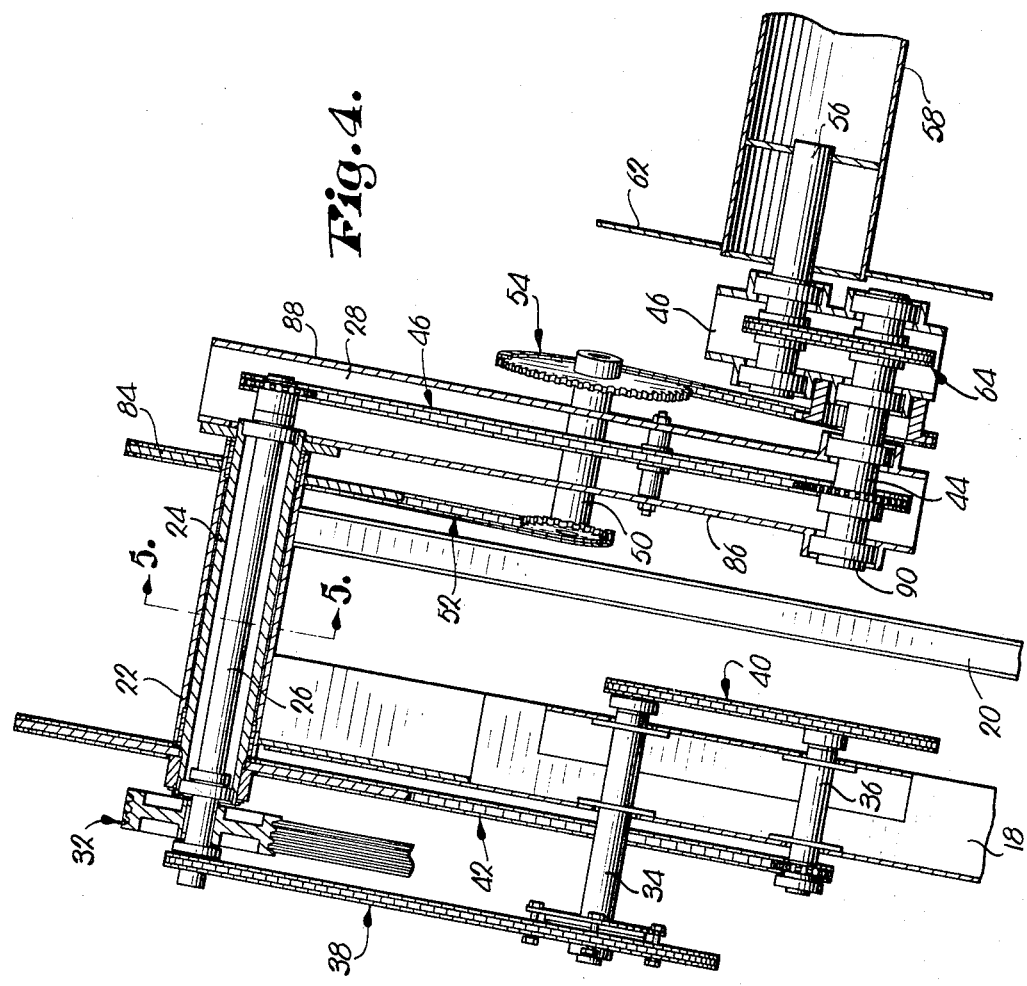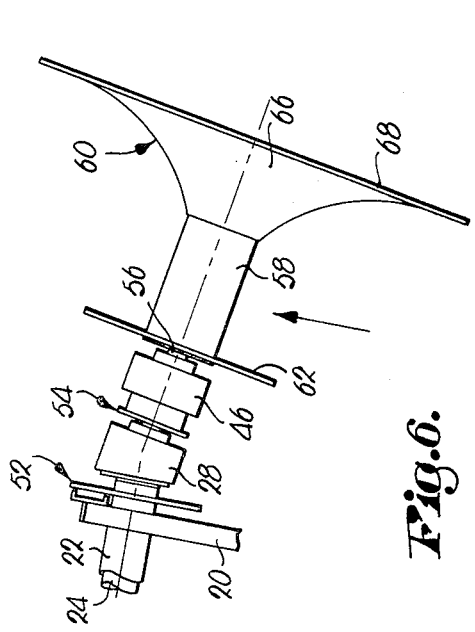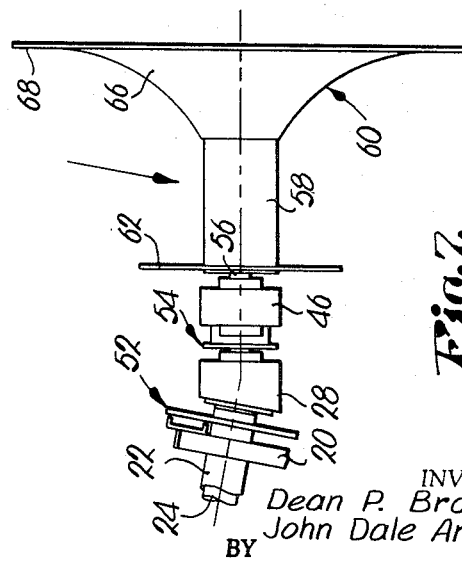

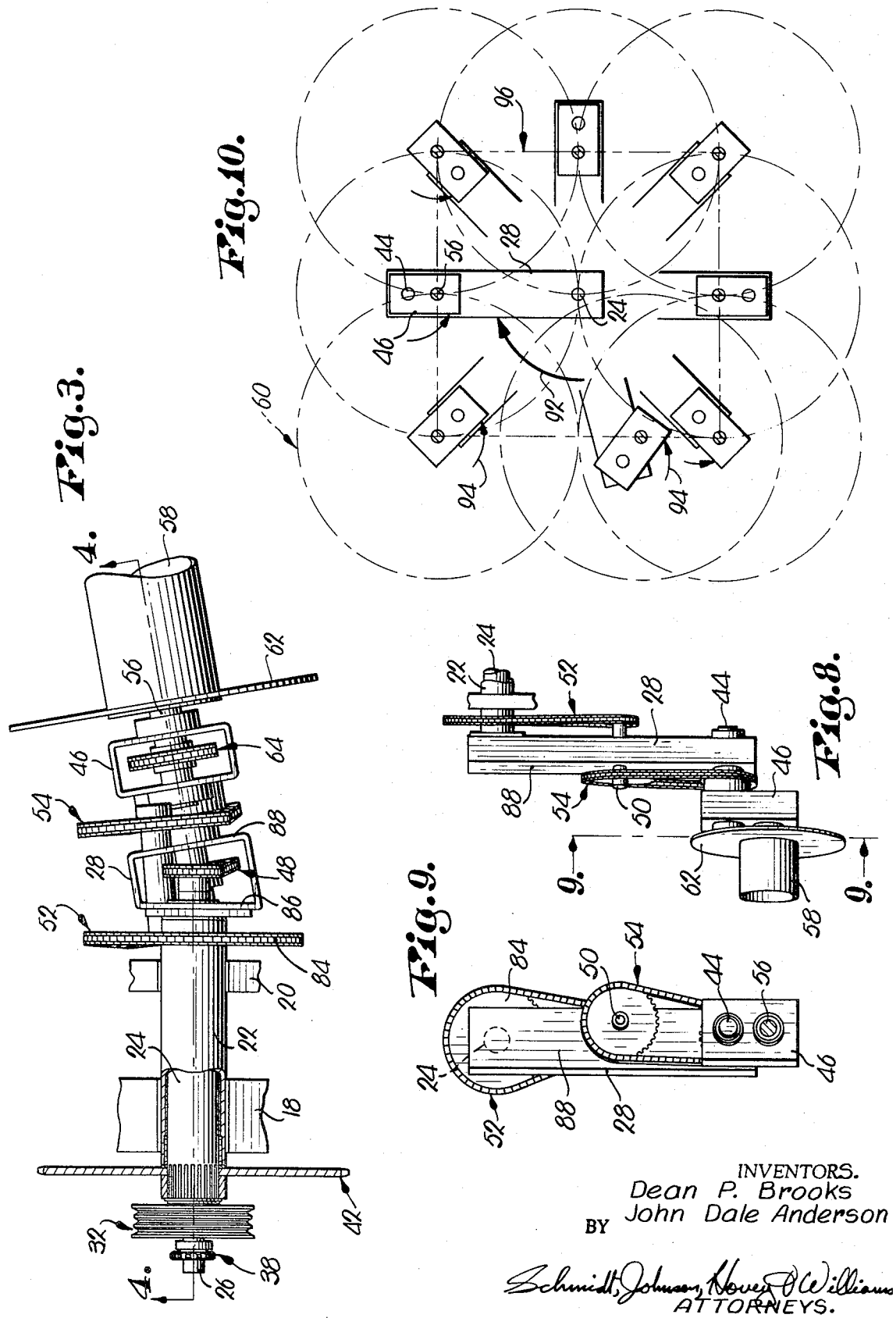

CONTINUOUS STACK FEEDER AND METHOD

An important object of the presnet invention is to provide for the feeding of hay or the like from a stack in a manner to permit discharge continuously either along the ground for open range livestock feeding, into rows of feed bunks or into grinders or other further processing equipment.

Another important object of the instant invention is the provision of feeding from a stack that is elevated onto a vehicle, permitting transport of the stack to a point or area of discharge, and if desired, movement of tha stack as the material is delivered therefrom in a continuous stream.

Still another important object of our present invention is to provide a stack feeder which is capable of not only cutting the material away from the stack but removing the material as it is cut away, all without interruption or slowdown as the result of clogging, jamming or overloading any of the operating mechanisms.

A further important object of our instant invention is to provide a feeder operable to quickly slice the material away from one end of a stack that is continuously advanced at a rate which will minimize the time necessary to carry out the operation of feeding the entire stack.

A still further important object of the present invention is to provide a cutter arrangement which effectively cuts entirely through the stack during each sweep of the cutter, and which will properly deliver the removed material to a lateral conveyor in a continuous, smoothly flowing stream from the moment of cutaway to the time of final discharge.

In the drawings:

FIG. 3 is an enlarged, fragmentary top plan view showing portions of the feeder tilted back to dispose the same horizontally;

FIG. 4 is a fragmentary cross-sectional view taken on line 4—4 of FIG. 3 with parts disposed as in full lines in FIGS. 1 and 2;

FIG. 6 is a view showing the bottom of the cutter;

FIG. 7 is a view showing the top of the cutter;

FIG. 8 is a fragmentary elevational view of that side of the sweep arms opposite from FIG. 1;

FIG. 9 is a cross-sectional view taken on line 9—9 of FIG. 8; and

FIG. 10 is a diagrammatical view illustrating the cycle of movement of the sweep arms and the cutter.

Figure 1:
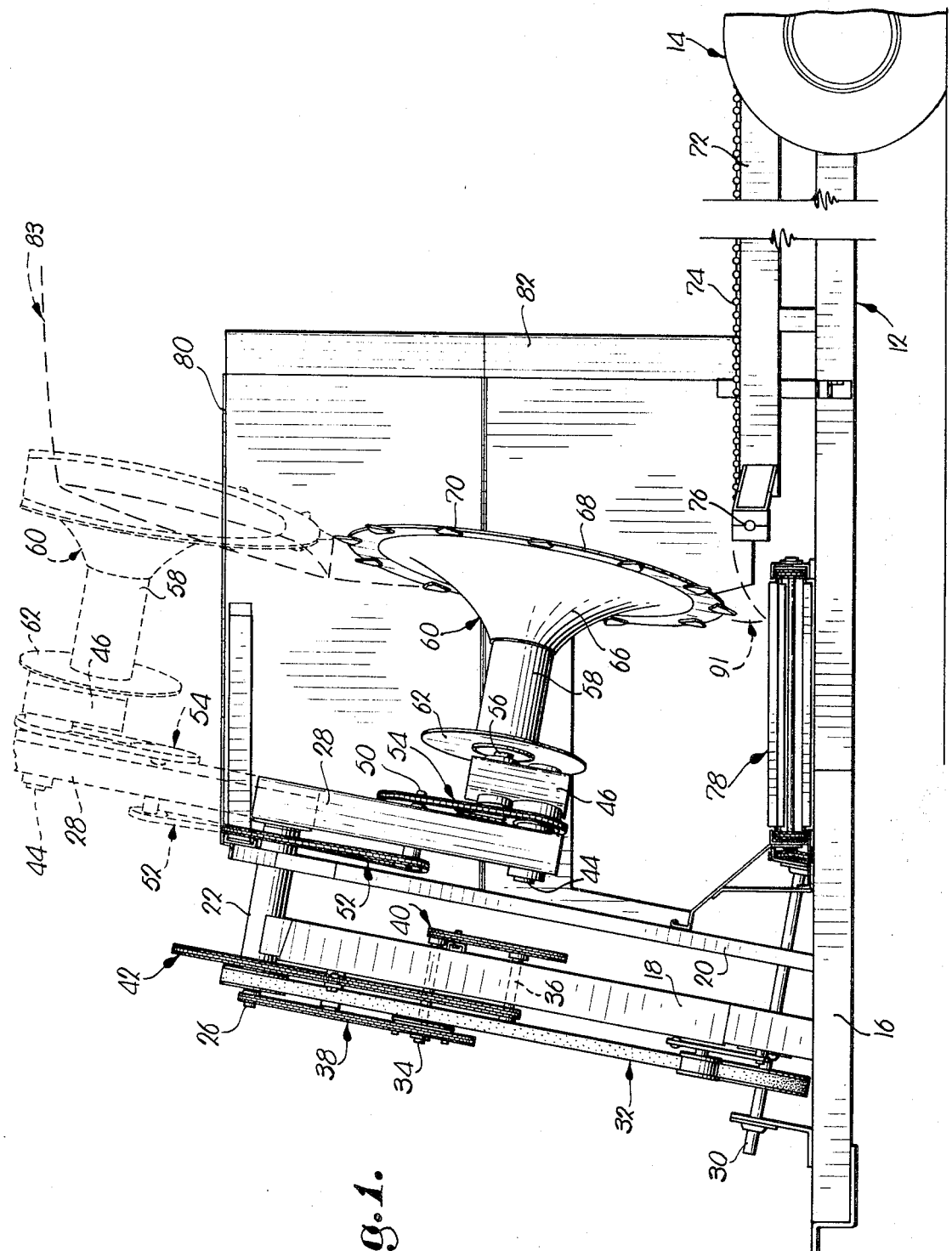
FIG. 1 is a fragmentary side elevational view of a continuous stack feeder made according to the present invention capable of carrying out the novel method hereinafter set forth, showing the cutter at its central, fully raised and fully lowered positions.

A chassis 12, supported by a wheel and axle assembly 14, has a tongue 16 which supports a mast 18 and a brace 20 provided with a rigid, downwardly and rearwardly inclined sleeve 22 at their upper ends. A tubular shaft 24, rotatable within the sleeve 22, and rotatably supporting a second shaft 26 coaxially therein, is affixed at its lower end to one end of an elongated, tubular arm 28.

A drive shaft 30, which may be driven from the power take-off shaft of a tractor coupled with the tongue 16, drives the shaft 26 through a belt and pulley assembly 32 between the shafts 26 and 30. A pair of jackshafts 34 and 36 are carried by the mast 18, the shaft 34 being driven by a chain and sprocket wheel unit 38 between shafts 26 and 34, the shaft 36 being driven by a chain and sprocket wheel unit 40 between the shafts 34 and 36, and the shaft 24 being driven by a chain and sprocket wheel unit 42 between the shafts 24 and 36 such that the shaft 24 rotates appreciably slower than the shaft 26.

The arm 28 has a stub shaft 44 rotatably mounted thereon at its opposite end, and a short, tubular arm 46 is rotatable at one end thereof on the shaft 44, the shafts 26 and 44 being interconnected by a chain and sprocket wheel unit 48 within the arm 28. A jackshaft 50 intermediate the ends of the arm 28 is coupled with the sleeve 22 through a chain and sprocket wheel unit 52, and with the arm 46 through a chain and sprocket wheel unit 54.

The arm 46 has a stub shaft 56 rotatably mounted thereon at its opposite end, and a tubular hub 58 of a cutter 60 is secured rigidly to the shaft 56. The hub 58 has a disc 62 affixed thereto adjacent the arm 46, and the shafts 44 and 56 are interconnected by a chain and sprocket wheel unit 64 within the arm 46.

A cutter 60 has a hollow, frustoconical body 66 secured at its apex to the hub 58 and provided with an outwardly radiating, circular band 68 at its base, the band having an annular series of cutter elements 70 secured thereto at its periphery.

The chassis 12 supports a number of transversely spaced, longitudinal beams 72 for vertical swinging movement about a horizontal axis (not shown) disposed intermediate the ends of the beams 72, and a conveyor chain 74 associated with each beam 72 is driven by a transverse shaft 76 that may in turn be driven in any suitable manner (not shown) from the shaft 30 or otherwise. Immediately ahead of the chains 74 below the cutter 60 is a transverse conveyor 78 carried by the chassis 12 and/or the tongue 16 and driven by the shaft 30. Upstanding side shields 80 carried by the chassis 12 have outwardly flared wings 82 at their rearmost, upright edges.

OPERATION

The vehicle illustrated may be backed toward a haystack or the like and the beams 72 with their chains 74 are tilted to place their rearmost ends (not shown) adjacent the ground. The chains 74 are then driven to load the stack, all in a manner similar to U. S. letters Pat. No. 3,209,932 in the name of Bruce A. Schiltz and dated Oct. 5, 1965, which patent is incorporated herein by reference as need may be for a full understanding of the present invention. Upon return of the beams 72 to the horizontal position shown in FIGS. 1 and 2, the implement with the stack 83 (FIG. 1) thereon may be moved to a point of discharge, whereupon the shaft 30 is driven to rotate the cutter 60 and to operate the conveyor 78. At the same time, the chains 74 are operated to progressively move the stack 83 toward the cutter 60.

The shaft 30 drives the assembly 32 to rotate the shaft 26, drive the unit 48, rotate the shaft 44, drive the unit 64, rotate the shaft 56 and the hub 58, thereby rotating the cutter 60 continuously about the axis of the shaft 56. Shaft 26 drives the unit 38 to rotate the shaft 34, drive the unit 40, rotate the shaft 36, drive the unit 42, rotate the shaft 24, and revolve the arm 28 continuously about the common axis of the shafts 24 and 26. As the shaft 50 revolves about stationary sprocket wheel 84 of the unit 52 (which is rigid to the fixed sleeve 22), the shaft 50 is rotated by the unit 52 to drive the unit 54 and revolve the arm 46 continuously about the axis of the shaft 44.

The hay sliced off the stack 83 by the cutter elements 70 falls onto the conveyor 78 which feeds the hay continuously into feed bunks, onto the ground in the case of range feeding of livestock, or into grinders or other equipment for further processing, it being understood that the vehicle may be advanced continuously or intermittently as desired or needed during continuous operation of the chains 74, the cutter 60 and the conveyor 78.

By virtue of the tilt of the mast 18, with a resultant inclination of the axes of shafts 24, 26, 44 and 56, the cutter 60 is angled so as to cut the proximal end of the stack 83 along an inclined plane that slopes downwardly and forwardly as the conveyor 78 is approached, such plane being, therefore, substantially parallel with the mast 18. This causes the hay being sliced away to slide properly along the convex face of the body 66 and to gravitate immediately to the conveyor 78 rather than build up in large accumulations before dropping as might be true if the mast 18 were vertical and the cut slice not caused to move downwardly at an angle somewhat parallel with the inclined mast 18. The tilt also causes the remnant of the stack 83 to be more stable as the trailing end of the stack 83 approaches the cutter 60. The disc 62 operates to prevent entanglement of the hay on the arm 46 and in the unit 54.

In addition, the cutter 60 has still another inclination which is best illustrated in FIGS. 1 and 6–8, showing an angularity between the axes of the shafts 24 and 44. The axes of the shafts 44 and 56 being parallel, it is seen that the hub 58 also rotates about an axis that is offset relative to the common axis of the shafts 24 and 26. The arm 28 has a wall 86 proximal to the brace 20 which is perpendicular to the axis of rotation of the shafts 24 and 26, and an opposed wall 88 proximal to the arm 46 which is perpendicular to the axes of rotation of the shafts 44 and 56. But the walls 86 and 88 are out of parallelism transversely thereof; therefore, bearing 90 of the shaft 44 is mounted on the wall 86 at an angle relative to the latter.

This out of parallelism arrangement is in a direction to establish a cant in the cutter 60 such that it slopes toward the kerf formed in the stack 83 by the cutter elements 70. That is to say, the cutter 60 has a bite which causes severance by only the leading cutter elements 70 as they sweep through their inclined plane, whereas the trailing cutter elements 70 recede away from the sliced end 91 of the stack throughout the entire cycle of movement of the cutter 60 about the axis of the shaft 44 and about the axis of the shafts 24 and 26. The inclined plane through which the trailing elements 70 sweep is therefore parallel to the plane of the leading elements 70, but spaced away from the end 91 of the stack 83.

As a consequence, the arrangement may be such that only about one half of the cutter elements 70 are actually operating to slice the hay at any given moment, and such that there is no such pressure or counter-drag of the stack 83 against the oppositely moving, receded half of the elements 70 along the receded portion of the cutter 60.

Moreover, the convex side of the body 66 of the cutter 60 is constantly opening the kerf at the receded side of the cutter 60, causing the spiral slice being cut away from the stack 83 to be deflected toward the disc 62 such that the slice will drop onto the conveyor 78 rather than fall against end 91 of the stack 83 where gravitation of the slice will be impeded. Manifestly, the cutaway slice will slide downwardly along the convex face of the body 66 much easier than down the inclined end 91 of the stack 83. These factors all contribute, therefore, to avoid a "pinch" between the end 91 of the advancing stack 83 and the slice because the weight and friction of the latter are on the body 66 rather than on the stack 83.

By provision of the arms 28 and 46, it is possible to feed from a polygonal stack 83 whose vertical and transverse dimensions (height and width) are appreciably greater than the diameter of the cutter 60 while, at the same time, properly cut through the core and through all four corners of the stack 83. As depicted in FIG. 10, the continuously rotating cutter 60 not only has a rather long sweep as it revolves about the axes of the shafts 24 and 26 but, at the same time, it also revolves about the axis of the shaft 44. In effect then, the cutter 60 moves along a generally polygonal path of travel. While the movement of the cutter 60 is not truly linear, either vertically or horizontally, its path is sufficiently square as to cut along substantially the entire cross-sectional area of the stack 83 confronted by the elements 70.

As the arm 28 revolves in the direction of the arrow 92 in FIG. 10, the arm 46 revolves oppositely four times as fast as the arm 28 as indicated by arrows 94 in FIG. 10. Thus, the path of the shaft 56 as shown in FIG. 10 is essentially along the dash lines which form a square configuration 96, such that the cutter 60 moves horizontally from left to right along the top of the stack 83, descends through an inclined path along one side of the stack 83, horizontally from right to left along the bottom of the stack 83 and then ascends through an inclined path along the opposite side of the stack 83.

Figure 2:
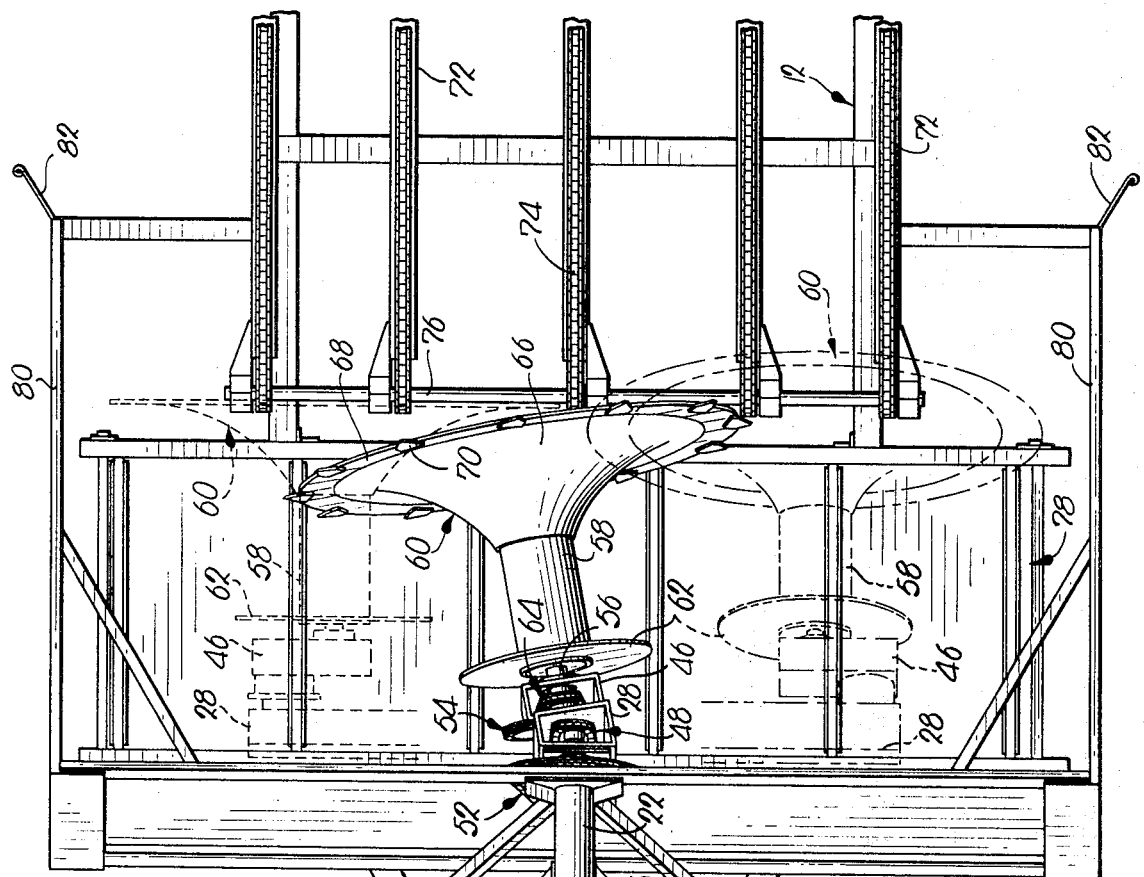
FIG. 2 is a fragmentary top plan view thereof showing three positions of the cutter—as it ascends, then moves horizontally and thereafter descends.
Figure 5:
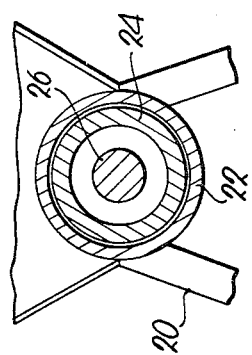
FIG. 5 is a fragmentary cross-sectional view taken on line 5—5 of FIG. 4.

The outer peripheral path of the cutter 60 also defines a substantial square whose dimensions exceed the width and height of the stack 83, it being noted in FIG. 1 that the upper limit of the cutter 60 is above the top of the stack 83 and that its lower limit is below the bottom of the stack 83, but above the conveyor 78. Also, as shown in FIG. 2, the outer periphery of the cutter 60 is between the sides of the stack 83 and the shields 80 during ascent and descent of the cutter 60.

Manifestly, the diameter of the cutter 60 in relation to the distance between the axes of the shafts 24 and 44, the distance between the axes of the shafts 44 and 56 and the height and width of the stack 83 is chosen to effect complete cutting, not only at the center of the stack 83 when the arm 46 fully overlaps the arm 28, but at the four corners of the stack 83 when the arm 46 is fully extended beyond the arm 28 as shown in FIG. 10. Advancement of the stack 83 by the chains 74 and lateral movement of the slice by the conveyer 78 is continued until the entire stack 83 is cut away and fed to the selected zone of discharge from the conveyor 78.

Having thus described the invention, what is claimed as new and desired to be secured by letters Patent is:

1. In a machine for continuously feeding material from a stack thereof:
   conveyor means underlying the stack for continuously advancing the latter along a substantially horizontal path of travel;
   a support spaced forwardly of the leading end of said stack;
   means for rotating said support within an upwardly extending plane; and
   a cutter rotatably mounted on the support between the latter and said end of the stack for movement of the cutter with the support around the axis of rotation of the support,
   the axis of rotation of the cutter extending toward said end of the stack and being at an angle to said axis of rotation of the support.

2. A machine as claimed in claim 1 wherein the path of travel of the cutter around said axis of rotation of the support is within a plane parallel with said plane of rotation of the support.

3. In a machine for feeding material from a stack thereof:
   an elongated arm mounted at one end thereof for rotation about a first axis;
   a stack-engaging cutter mounted on the arm at the opposite end of the latter for revolution with the arm about said first axis and for rotation with respect to the arm about a second axis spaced radially outwardly from said first axis; and
   means operably coupled with the arm and with the cutter for rotating the same simultaneously about said respective axes of rotation thereof,
   said axes being out of parallelism in a direction to establish a cant in the cutter such that the cutter slopes toward the kerf formed thereby in the stack.

4. In a machine for feeding material from a stack thereof:
   an elongated arm mounted at one end thereof for rotation about a first axis;
   a stack-engaging cutter mounted on the arm at the opposite end of the latter for revolution with the arm about said first axis and for rotation with respect to the arm about a second axis spaced radially outwardly from said first axis; and
   means operably coupled with the arm and with the cutter for rotating the same simultaneously about said respective axes of rotation thereof,
   said axes sloping downwardly toward the stack such that the cutter severs an inclined slice from the stack.

5. In a machine for feeding material from a stack thereof:
   an elongated arm mounted at one end thereof for rotation about a first axis;
   a stack-engaging cutter mounted on the arm at the opposite end of the latter for revolution with the arm about said first axis and for rotation with respect to the arm about a second axis spaced radially outwardly from said first axis;
   means operably coupled with the arm and with the cutter for rotating the same simultaneously about said respective axes of rotation thereof; and
   a pair of shafts operably coupled with the arm and with the cutter respectively, said first axis being common to said shafts, said means operating to rotate the shafts at differential speeds.

6. In a machine for feeding material from a stack thereof:
   a first elongated arm mounted at one end thereof for rotation about a first axis;
   a second elongated arm mounted on the first arm at the opposite end of the latter for revolution with the first arm about said first axis and for rotation with respect to the first arm about a second axis spaced radially outwardly from said first axis;
   a stack-engaging cutter mounted on the second arm at the opposite end of the latter for revolution with the second arm about said second axis and for rotation with respect to the second arm about a third axis spaced radially outwardly from said second axis; and
   means operably coupled with the arms and with the cutter for rotating the same simultaneously about said respective axes of rotation thereof.

7. A machine as claimed in claim 6, said second and third axes being parallel.

8. A machine as claimed in claim 6; and a pair of shafts operably coupled with the arm and with the cutter respectively, said first axis being common to said shafts, said means operating to rotate the shafts at differential speeds.

9. A machine as claimed in claim 6 wherein rotation of the second arm is responsive to rotation of the first arm.

10. A machine as claimed in claim 9 wherein said first arm is rigid to one of said shafts and rotation of the second arm is responsive to rotation of said one shaft.

11. A machine as claimed in claim 6 wherein two of said axes are out of parallelism in a direction to establish a cant in the cutter such that the cutter slopes toward the kerf formed thereby in the stack.

12. A machine as claimed in claim 11 wherein said axes slope downwardly toward the stack such that the cutter severs an inclined slice from the stack.

13. A machine as claimed in claim 12 wherein said cutter has a circular band surrounding said third axis and provided with a plurality of spaced cutter elements at its periphery.

* * * * *